United States Patent [19]

Eberle

[11] 4,336,437
[45] Jun. 22, 1982

[54] METHOD OF EXTRUSION-FUSION WELDING OF LEAD PARTS THROUGH AN APERTURE IN A BATTERY CASE

[75] Inventor: William J. Eberle, Reading, Pa.

[73] Assignee: General Battery Corporation, Reading, Pa.

[21] Appl. No.: 206,758

[22] Filed: Nov. 14, 1980

Related U.S. Application Data

[63] Continuation of Ser. No. 948,979, Oct. 5, 1978, and a continuation-in-part of Ser. No. 790,881, Apr. 26, 1977, Pat. No. 4,166,210.

[51] Int. Cl.³ .......................................... B23K 11/16
[52] U.S. Cl. ............................... 219/78.16; 219/91.1; 219/91.23; 219/92
[58] Field of Search ................. 219/78.16, 91.1, 91.23, 219/92

[56] References Cited

U.S. PATENT DOCUMENTS

| | | | |
|---|---|---|---|
| 1,061,376 | 5/1913 | Heany | 219/119 |
| 2,024,239 | 12/1935 | McBain | 219/10 |
| 2,180,396 | 11/1939 | Burke | 219/4 |
| 2,282,186 | 5/1942 | Henninger | 219/91.23 X |
| 3,134,883 | 5/1961 | Bennett et al. | 219/119 |
| 3,476,611 | 11/1969 | Sabatino | 136/134 |
| 3,629,544 | 12/1971 | Becker | 219/93 |
| 3,666,912 | 5/1972 | Anderson | 219/119 X |
| 3,687,734 | 8/1972 | Orlando | 136/134 R |
| 3,723,699 | 3/1973 | Allen | 219/78 |
| 3,793,086 | 2/1974 | Badger | 219/91.23 |
| 3,869,316 | 3/1975 | Matter | 219/118 |
| 3,909,300 | 9/1975 | Schenk, Jr. et al. | 29/623.1 |
| 4,013,864 | 3/1977 | Tiegel | 219/80 |
| 4,046,062 | 9/1977 | Matter | 29/623.1 |

Primary Examiner—Richard R. Kucia
Attorney, Agent, or Firm—Benasutti Associates, Ltd.

[57] ABSTRACT

The present invention provides a novel method of extrusion-fusion welding of lead parts through an aperture in a battery case which uniformly controls the area of contact between members to be welded at the completion of the extrusion process in order to produce consistent, high-quality welds exhibiting higher strength and superior durability.

11 Claims, 8 Drawing Figures

METHOD OF EXTRUSION-FUSION WELDING OF LEAD PARTS THROUGH AN APERTURE IN A BATTERY CASE

CROSS REFERENCE TO RELATED APPLICATIONS

This is a continuation of application Ser. No. 948,979, filed Oct. 5, 1978.

This application is also a continuation-in-part of my prior U.S. patent application Ser. No. 790,881, filed Apr. 26, 1977, now U.S. Pat. No. 4,166,210 issued Aug. 28, 1978, and entitled "ELECTRODES FOR USE IN THE EXTRUSION-FUSION WELDING OF LEAD PARTS THROUGH AN APERTURE IN A BATTERY CASE AND METHOD OF EXTRUDING, FUSING AND FORGING LEAD CONNECTIONS IN BATTERY CASES" which application is incorporated by reference as if fully set forth herein.

BACKGROUND OF THE INVENTION

The present invention relates generally to methods of making intercell welds in electric storage batteries and in particular to those methods where electrodes are oriented on either side of a partition or other aperture in a battery case, lugs or other battery parts are placed over each side of that aperture, contact produced therebetween, current passed through the lead parts to melt the same and pressure applied generally for the purpose of providing an electrical connection through the aperture. Such an apparatus is disclosed in U.S. Pat. No. 4,013,864.

It is long known that lead parts on either side of a partition with an aperture formed therein can be welded through that aperture using anyone of a number of techniques. In the lead acid battery art, the most common site for welding through an aperture is during the formation of intercell connections, that is, in making the electrical connections between one battery cell and the next and/or between the end most battery cells and the exterior battery terminal of the battery. Since connections through apertures of this sort, in addition to being electrical, must provide a liquid seal from cell to cell to prevent "pumping", some attention has been directed in the concerning various methods for insuring that an intercell connector, in addition to providing a good electrical connection, will also exhibit good sealing characteristics.

U.S. Pat. No. 3,687,734, generally discloses a connector for electrically connecting two elements of a storage battery through an aperture wherein at least one of the connectors lugs is provided with a passage extending therethrough. Molten material from an external portion of the connector exists through this passage during the heat fusion step as a result of pressure from a heat energy build up. The patentee attempts by this structure to avoid the problem of blow outs or lead expulsion which has been encountered by many practitioners in this art.

Another attempt to avoid "blow out" is disclosed in U.S. Pat. No. 3,476,611, wherein an intercell connections are by a projection welding process from pins which extend through the partition between two adjacent battery compartments, which pins have dimensions such that, when they are fluidized during the process, the volume of the pin material does not exceed the volume defined by the walls of the opening.

Such attempts inherently involve tolerance and positioning problems during the manufacturing and assembly of the parts in battery. More recently, other methods have been developed for producing battery intercell electrical connections, which methods have generally been referred to as "extrusion-fusion" type method. For example, in U.S. Pat. No. 3,793,086, a method is disclosed wherein flat surface connector lugs are placed on each side of the battery partition wall, adjacent an aperture. The connector lugs are extruded by a pair of opposed electrodes into the aperture until they meet, whereupon an electrical welding current is applied. When the welding current ceases, the connectors are allowed to cool. As stated in this patent, "it should be emphasized that reduction of the initially applied shear force during the welding cycle is essential. If the high applied shear force is maintained during the welding cycle, molten lead will be squirted from the welding joint and an imperfect joint can result."

Another approach to the problem of "blow outs" is that disclosed, for example, in U.S. Pat. No. 4,046,062, wherein separate hold down sleeves are employed to clamp the lugs into sealing engagement with the partition wall aperture prior to and during the extrusion-fusion process. After clamping, metal is extruded until contact is made, electric current is then passed through the extruded metal to melt it, and, under the continuing force of the electrodes, metal is caused to flow into any voids in the aperture while, at the same time, extruding more metal out of the lugs into the aperture until the aperture is packed full of lug metal.

In U.S. Pat. No. 3,896,316, a similar extrusion-fusion system is disclosed wherein high density polyurethane pads are provided around each of the electrodes to clamp the lugs tightly against the walls of the intercell connection during the extrusion, fusing the cooling steps.

In U.S. Pat. No. 3,723,699, the problem of blow outs or lead expulsion is expressed in a projection welding context wherein the lugs are provided with upstanding annular ribs which surround the hole in the partition wall and are caused to bite into the partition wall, in an attempt to minimize flow and to provide a good mechanical key between the lugs and partition wall, thus minimizing the possibility of relative sliding movement between the lugs and partition wall.

Accordingly, as seen from the above described prior art references, considerable problems have been experienced with blow outs, particularly where lead is extruded into the aperture of the partition with the intent of filling the same. Extrusion-fusion welding processes have none the less achieved considerable success in the industry.

Since the development of extrusion-fusion welding processes, other problems have also been encountered in controlling the types of welds which are obtained under actual production conditions in battery plants. It is long been known, for example, that variations in such parameters as the electrical welding current, squeezing pressure, and in the dimensions of the connector lugs and/or the partition or casing wall thickness has a direct effect on the quality of the weld. In the past, these parameters were adjusted and the resulting welds were then inspected to determine the quality thereof. This adjustment and inspection process continued until welds meeting the predetermined criteria were obtained.

After this initial set up procedure, which can be very time consuming and laborious, an attempt is then made to maintain these parameters constant throughout the subsequent production. Unfortunately, changes in one or more of these parameters during the ensuing production could have a detrimental effect on the quality of the welds produced thereby. In some cases, these welds will tend to over heat and blow out, while in other cases, cold or incomplete welds may be formed.

Although, as stated above, a number of conditions may account for the variability from weld to weld, I have found that the condition of the lugs contribute substantially to the great variability in weld performance. Lugs are typically cast of lead alloys which harden as they age, and, which during the preceding battery manufacturing operations may acquire varying surface characteristics. For example, lugs which are cast in conventional parts molding machines may have a slight residue of oil or other film which adheres thereto from the casting machines (as, for example, films used to aid in the release of the parts which are cast).

Lugs may also age in the battery plants for varying lengths of time depending upon their sequence of use. During storage they may be exposed to varying quantities of lead oxide dust and/or other contaminents present in the battery plant, and may be subjected to various additional contaminents depending upon the operations employed to fuse those lugs to their respected straps. In some battery manufacturing plants, the lugs may be cast in a "cast-on" machine or may otherwise be formed and fused to the straps with a much lesser degree of aging prior to the final battery assembly.

Once associated with the groups, the lugs are particularly prone to contamination as a result of shedding or other direct or indirect exposure to the active material of there associated groups or elements. Finally, depending upon the manufacturing process employed to make the cases, variable contaminations of the lugs surfaces routinely occurs.

Prior art extrusion-fusion techniques, to the extent they have attempted to control parameters of surface contamination, tend to rely on sensing the establishment of an electrical current path through the lugs at or near the completion of the extrusion process, that is, at the time contact is created between the lugs within cellular aperture. Unfortunately, variations in surface contaminations of the lugs considerably change the surface resistance of the lugs; therefore, methods in which the establishment of a certain degree of electrical contact within the aperture is sensed, tend to begin the weld cycle relatively earlier or later depending upon how dirty the lug surfaces are at their points of contact, i.e., how much lug contact area need be established in order to trigger the weld cycle.

Other prior art methods have focused upon controlling the pressure of extrusion to thereby presumably establish a uniform contact area between the lugs, regardless of there surface contamination. Due to the variability aging processes however, and the consequent variations in the hardness of the lugs to be extruded (depending upon the age of those lugs), close control of the extrusion pressure from weld to weld results in variations of contact area between the lugs.

Other prior art methods have used mechanical stops to limit the extrusion of the extruding apparatus in order to establish a uniform contact area between the lugs. However, variations in lug dimensions will effect the contact area thereby rendering this technique less than satisfactory.

SUMMARY OF THE INVENTION

The present invention generally relates to a novel method of extrusion-fusion type welding lead parts through an aperture in the wall of a battery case, and more particularly, a method, the use of which obviates the necessity for time consuming, laborious set up procedures, variable pressure control, separate clamps, or particular lug or aperture configurations, and which produces an extremely homogeneous weld with a uniform grain structure and surprising strength heretofore unknown and unachievable in battery manufacture.

The superior characteristics of the welds (and batteries produced therewith) result from numerous features incorporated in applicants novel method. One such feature is the novel electrode tip used in performing the method of applicant's invention. Applicant has recognized that the extrusion portion of the electrode, that is, the tip portion which initially upsets the metal to cause the initial contact thereof within the aperture, should be disposed generally away from a forging portion, that is, a portion which, in addition to other functions, tends to limit the extrusion of the electrode during the cold extrusion phase, whereby the degree of metal-to-metal contact within the aperture is uniformly limited.

Applicant has also found that by providing the electrode tip with an annular forging portion surrounding the aperture in order to forge the lug around the aperture at least during the aperture filling compression process, the problem of blow-outs is eliminated and a substantially denser, stronger, gas-free, homogeneous weld is attained. To the embodiment of the electrode tip, which is preferred for carrying out applicants novel method, the annular forging portion is configured with a contacting surface which is forced into the lug in order to create a sealing zone of high compression leads surrounding the aperture. The forging portion also includes an inner beveled surface which additionally forges lead adjacent to the high compression sealing zone toward the central axis of the aperture. The annular forging portion further acts as a cold heat sink for lead disposed adjacent to that portion of the electrodes, to prevent the melting of same.

Applicant has found that it is not necessary to use differential pressures during the initial upsetting and subsequent compression processes. Accordingly, far greater lug, partition and aperture tolerances are established so that weld powers, hold times and hold pressures exhibit substantially greater latitudes then heretofore exhibited by prior art methods.

Accordingly, a primary object of the present invention is the provision of a novel battery having intercell welds exhibiting superior strength and quality.

Another object of the present invention is a method for extrusion-fusion type welding for forming intercell welds through an aperture in a lead acid storage battery wherein the degree of metal-to-metal contact within the aperture is uniformly limited to a predetermined magnitude prior to fusion.

A further object of the present invention is the provision of a method for producing intercell welds in automotive storage batteries while overcoming attendant problems with blow-out.

An additional object of the present invention is the provision of an extrusion-fusion type method for forming intercell welds in a lead acid storage battery wherein significantly greater lug, partition and aperture misalignments may be suitably accommodated without readjusting to compensate for same.

These and other objects of the present invention will become apparent from the following more detailed description.

DETAILED DESCRIPTION OF THE DRAWINGS

Figure 1:
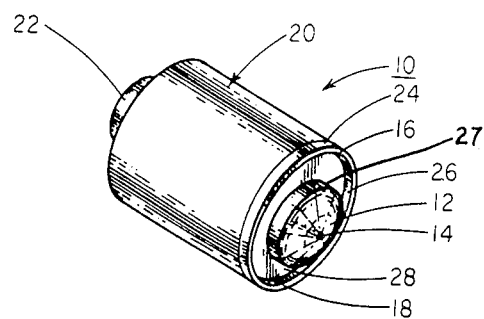
FIG. 1 is a perspective view of the preferred embodiment electrode of the present invention.

Although specific forms of the invention have been selected for illustration in the drawings, the following description is drawn in specific terms for the purpose of describing these forms of the invention, this description is not intended to limit the scope of the invention which is defined in the appended claims.

The present invention relates to a method of welding lead or lead alloy lugs through an aperture in a wall of a battery case, as for example, through an aperture in an intercell partition of a battery case to produce an intercell connection, or alternatively, through an exterior wall of the battery case to form a battery terminal. This method basically comprises positioning the lugs on opposing sides of the aperture to least entirely overlap the aperture, extruding at least a portion of the lugs into the aperture to touch within the aperture, passing current through the lugs to melt portions of the lugs at least within the aperture, compressing at least the melted portions within the aperture to fill the aperture and forging unmelting portions of the lugs surrounding the aperture at least during a portion of the compression step to prevent blow out of the melted portion during compression.

Referring now to FIG. 1, there is shown the preferred embodiment of an electrode tip, generally referred to as 10, used to carry out the method of the present invention. Electrode 10 comprises a conical extrusion portion 12 having a vertex 14. The conical extrusion portion 12 is surrounded by a concentric, circular forging portion 16 having a contacting surface 18, which is more clearly shown in FIGS. 2-6. Both the conical extrusion portion 12 and the forging portion 16 are disposed on one end of a cylindrical body 20. The conical extrusion portion 12 is preferably positioned coaxially with the cylindrical body 20 with the plane of the contacting surface 18 being substantially perpendicular to the coincident axes.

A jaw mount 22 is provided on the opposite end of the cylindrical body 20 from the conical extrusion portion 12 and forging portion 16 in order to enable the electrode to be conveniently mounted on welding jaws (not shown). As shown more clearly in FIG. 2, the forging portion includes an outer beveled surface 24 and an inner beveled surface 26 both of which slope away from the contacting surface 18. The outer beveled surface 24 results from the inclusion of a draft on the outer end surface of the forging portion 16. In the preferred embodiment, the draft angle is 3°. The inner beveled surface 26 terminates in a recess 28, the surface of which is substantially perpendicular to the axis of the cylindrical body 20. It has been imperically determined that the angle of the inner beveled surface 26 can range between 3° and 15° and still be effective in minimizing weld blow outs as will be subsequently described. In the preferred embodiment, the angle is between 5 and 8 degrees.

A surface 27 extends from the base of the conical extrusion portion 12 to the surface of the recess 28 at a draft angle which, in the preferred embodiment, is equal to 3°. The distance between the base of the conical portion 12 and the surface of the recess 28 is substantially equal to 1/16 of an inch in the preferred embodiment. The electrode 10 is constructed of a material having good electrical conductivity and hardness characteristics.

Figure 2:
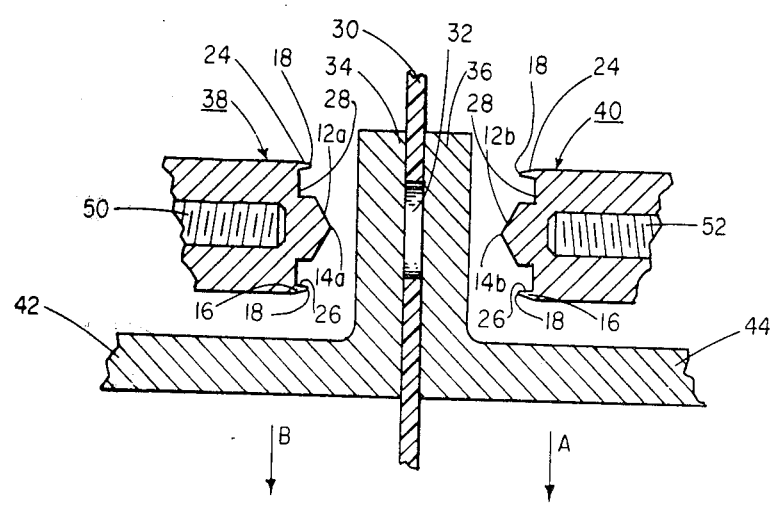
FIG. 2 is a cross section of the portion of a battery showing flat lugs disposed on either side of an intercell partition with an aperture formed therein and with two preferred embodiment electrodes similar to that illustrated in FIG. 1 above shown disposed in stand by positions spaced apart from the lugs and oriented axially with the aperture of the partition through which the intercell connection is to be formed.

Referring now to FIG. 2, there is shown a cross section of a portion of a battery partition 30 having an aperture 32 to form therein and having lugs 34 and 36 disposed there against to overlap the aperture 32. The orientation of the electrodes, designated generally 38 and 40, with respect to the aperture prior to welding is also illustrated. The lugs 34 and 36 are shown to comprise generally flat surfaces which may lie up against the complimentally opposing surfaces of partition 30. The lugs are selected to be of a width and height so that precise alignment with respect to the aperture 32 is not necessary. The importance of this fact resides in part upon the fact that each lug 34 and 36 is formed or cast as part of straps 42 and 44 respectively, which, although not shown, are welded to a plurality of battery plates which make up a group of elements of the battery and which, during the assembly process, are slipped into the case generally in the direction shown by arrows a and b in FIG. 2, so that portions of the lugs 34 and 36 overlap the partition aperture 32.

It will also be noted from FIG. 2 that the use of lugs 34 and 36 with flat surfaces disposed thereon allow the finished groups to be inserted down into the case without fear that any particular portion of the lugs will hang up on the partition, and further without the problems attendant with projection welding techniques for first getting the groups into the battery cells and then for positioning the projections in the aperture, as more fully described for those techniques in U.S. Pat. No. 3,364,076.

As seen in FIG. 2, the electrodes designated generally 38 and 40 are aligned substantially coaxially with aperture 32. The conical extrusion portions 12a and 12b terminate in vertexes 14a and 14b for initially contacting the lugs and for extruding the same into the aperture 32. The diameter of the base of the conical extrusion portion 12 is substantially equal to the diameter of the aperture 32. However, when used in a production environment, it may be necessary to make the diameter of the base smaller than the diameter of the aperture in order to compensate for misalignment due to production alignment tolerances.

A misalignment, wherein a portion of the conical extrusion portion overlaps a portion of the edge of the aperture, can cause pinching and plastic inclusions in the weld which detrimentally effect the quality of the weld. Consequently, the phrase "substantially equal to" is intended to include differences in diameters which are necessitated by practical implementation considerations such as compensation for production alignment tolerances. In the embodiment preferred for carrying out the method of the present invention, when welding through an aperture having a diameter substantially equal to 7/16 of an inch, the diameter of the base of the conical extrusion portion is substantially equal to ⅜ of an inch. With a base diameter equal to ⅜ of an inch, the height of the vertex 14 should lie within a range of 1/32 of an inch to 3/32 of an inch and is preferably 1/16 of an inch. The range of heights has been emperically determined and relates to the functional requirements of the conical extrusion portion 12 necessary to carry out the method of the present invention, as will be hereinafter described.

The diameter of the concentric, circular forging portion must be small enough to preclude overhanging an edge of the lug, but large enough to prevent overlapping any portion of the aperture edge in order to minimize blow outs in the weld and also large enough to stall further cold extrusion of the lugs, both of which features relate to steps in the method of the present invention and will be more fully described hereinafter. The diameter should fall within the range of ½ to ⅝ of an inch. In the embodiment preferred to carry out the method of the present invention, the diameter of the circular contacting surface 18 is substantially equal to ⅝ of an inch. As shown in FIG. 2, threaded bores 50 and 52 are additionally provided in each electrode to receive threaded shafts for mounting electrode to welding jaws (not shown).

As previously stated, the electrode should be of sufficient hardness to exhibit acceptable durability during the lead and lead alloy working processes to which they are to be subjected. For this purpose, number 25 beryllium copper is the preferred material from which the extrusion portion 12 and forging portion 16 may be milled or otherwise formed.

Figure 3:
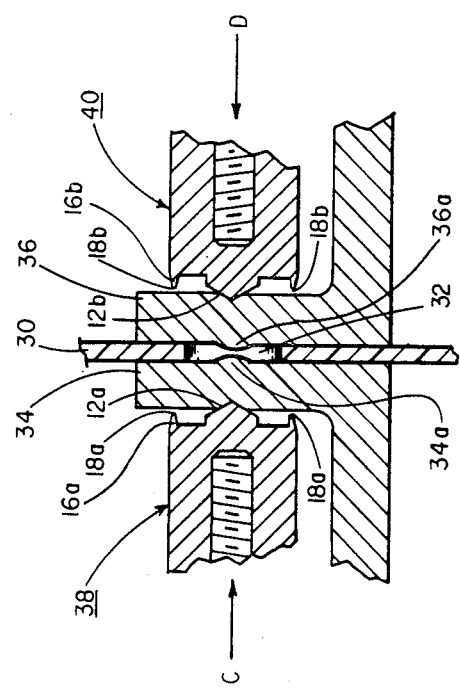
FIG. 3 is a cross section similar to the view shown in FIG. 2, wherein the electrodes have been moved into contact with the lugs and have begun to extrude portions of those lugs into the aperture formed in the intercell partition.
Figure 8:
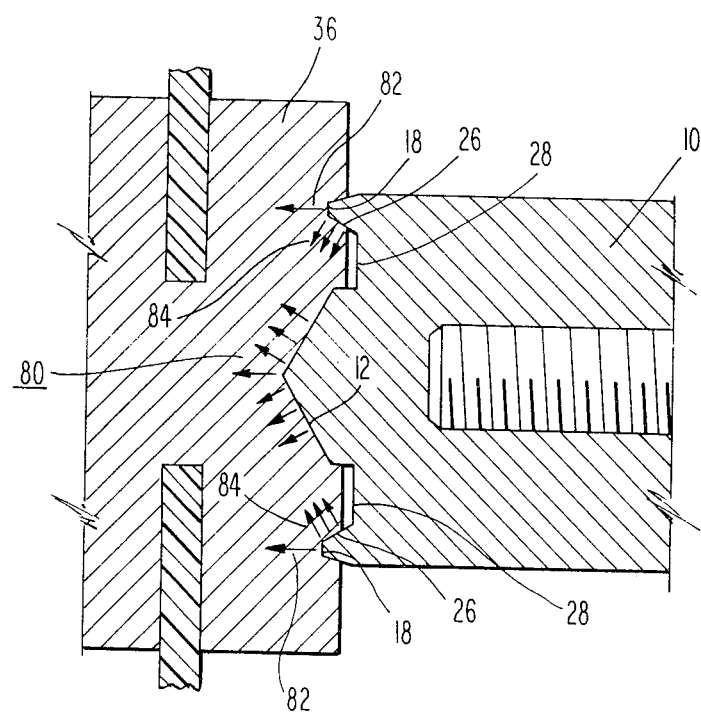
FIG. 8 is a cross section similar to FIG. 6 wherein the compressive forces exerted on the lugs in accordance with the method of the present invention are schematically represented by lines and arrows.

Referring now to FIG. 3, electrodes 38 and 40 have begun to move together in the directions of arrows C and D to a point where the conical extrusion portions 12a and 12b have begun to contact lugs 34 and 36 into extruded portions 34a and 36a of those lugs into the aperture 32. The conical shape of the extrusion portion 12 causes the lug material to be forced into the aperture and away from its center, a wedge-like effect which tends to fill the aperture with lug material. This effect is further illustrated in FIG. 8 where lines and arrows, collectively referred to as 80, schematically show the compressive forces exerted on, for example, lug 36, by the conical extrusion portion 12 of the contacting electrode 10. At the position illustrated in FIG. 3, the contacting surfaces 18a and 18b of the forging portions 16a and 16b have not yet begun to contact the lugs 34 and 36.

Figure 4:
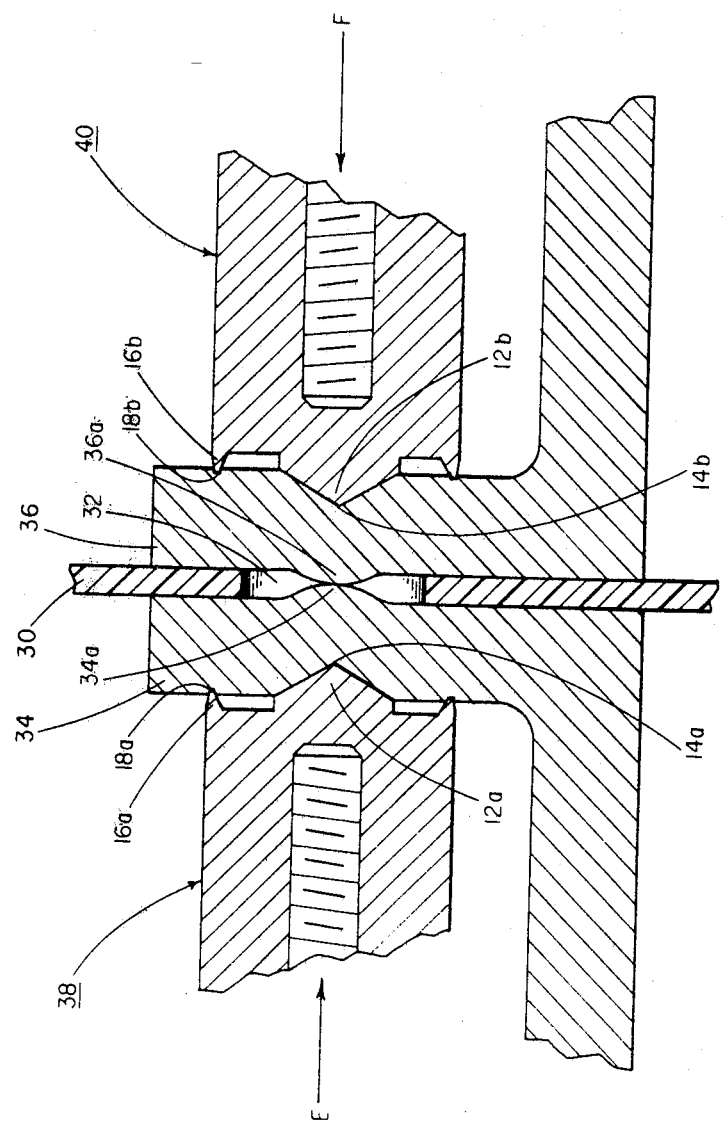
FIG. 4 is a greatly enlarged cross section similar to FIGS. 2 and 3 wherein the electrodes have proceeded with the extruding step to a point where metal-to-metal contact between the lugs is established within the aperture and at a point where the contacting surface of the forging portions of the electrodes have contacted the lugs.

FIG. 4, which is greatly enlarged cross section similar to FIG. 3, illustrates the continued movement of the electrodes together to a point where the contacting surfaces 18a and 18b of the forging portions 16a and 16b have contacted the surfaces of the lugs 34 and 36 and are slightly embedded therein at which point further movement of the electrodes is stalled. In the embodiment of the electrodes preferred to carry out the method of the present invention, the contacting surfaces become embedded to a depth equal to about 0.005" before the movement of the electrodes actually stops. At this point, extruded portions 34a and 36a have made the desired degree of contact within the aperture 32. The force applied to the electrodes 38 and 40 which urges them in the directions indicated by the arrows e and f is of such a magnitude that the extrusion portions 12a and 12b will extrude the hardest of the lugs to be welded, while at the same time being insufficient to overcome the stalling effect of the forging portions 16a and 16b in the softest of lugs after the contacting surfaces 18a and 18b of the forging portions 16a and 16b have made contact with the surfaces of the lugs 34 and 36 respectively. In the preferred embodiment, with the diameter of the contacting surface being equal to ⅝ of an inch, this force is substantially equal to 680 pounds.

The stalling effect of the forging portions 16a and 16b effectively limits the extrusion movement of each of the electrodes to the axial distance measured from the vertex 14 of the extrusion portion 12 to the intersection of the plane containing the contacting surface 18 with the axis of the electrode. In the preferred embodiment, this distance is substantially equal to ½ the thickness of the battery partition 30. When used for welding through battery partitions having nominal thickness of 0.070 inch, the contacting surface 18 is 0.035 inch from the vertex 14. Accordingly, it may be seen that for this phase of the process, the relative thickness of the lugs 34 and 36 are immaterial to the proper functioning of the extruding portions 12a and 12b and therefore the proper contacting area will always be formed within the aperture upon engagement of the contacting surfaces 18a and 18b with the lugs 34 and 36 respectively.

Figure 5:
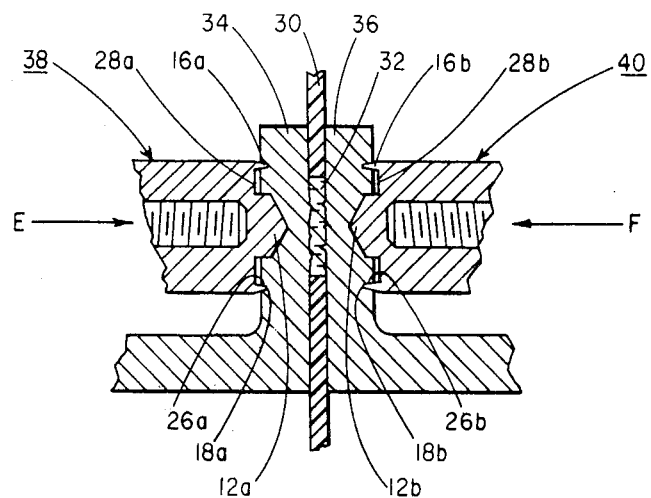
FIG. 5 is a cross section similar to FIGS. 2 and 3, wherein fluidization of lead within the aperture has been effected and the electrodes bought further together so that the molten metal fills the aperture.

After the proper contact area has been established between the lug portions 34a and 36a, a current is applied by the electrodes through the lugs in order to fluidize the lead within the aperture. This current is applied immediately upon the establishment of the proper metal-to-metal contact area within the aperture in the movement of the electrodes together continues in a smooth and uninterrupted fashion as shown in FIG. 5. There it may be seen that the forging portion 16a and 16b, in combination with the extrusion portions 12a and 12b, have continued to move together in the directions E and F to force the lead to completely fill the aperture 32 in the partition 30. In the preferred embodiment, each electrode continues to move for a distance substantially equal to 0.025 inch.

As previously stated, the relationship of the height of the conical portion 12 to the diameter of its base, a relationship which defines the included angle or sharpness of the cone, has been emperically determined. For the base diameter of ⅜ of an inch, the sharpest cone has a height of 3/32 of an inch and the flattest has a height of 1/32 of an inch. It has been found that sharper cones, cannot adaquately function to follow in and hydraulically fill the aperture with fluidized lead in accordance with the method of the present invention, since the forging portion would bottom out before the aperture has become filled. This creates voids or "worm holes" which have a detrimental effect on the quality of the weld. In addition, the greater height of the cone causes a deeper depression 76 (see FIG. 7) in a lug which would tend to weaken the completed weld. In addition, it has been found that flatter cones do not permit the uniform establishment of the proper initial contact within the aperture. Also, an entirely flat extrusion portion was found to cause plastic inclusions in the weld as well as non-uniform initial heat contact area.

It should be noted that as the aperture 32 is being filled with lead, the forging portions 16a and 16b are further embedded into the exterior surfaces of the lugs 34 and 36. In the preferred embodiment, the contacting surface 18 of each electrode becomes embedded in the lug for a total depth of approximately 0.030 inch. This penetration of the contact surfaces 18a and 18b of the forging portions 16a and 16b into the surfaces of the lugs 34 and 36 respectively, during fluidization of the lead within the aperture, will prevent the expulsion of molten lead from the aperture, commonly known as "blow-out".

At the present time, it is not fully understood how the forging portions 16a and 16b act within this environment to eliminate problems of blow out. It is theorized that the circular contacting surface 18 which surrounds the aperture produces an annular zone of high compression lead which acts as a seal preventing lead expulsion from the weld zone. This is schematically shown by the lines and arrows 82 in FIG. 8 which represents the compressive force exerted by the circular contacting surface 18.

It is further theorized that the inner beveled surface 26 of the forging portion 16, in acting to form or force that portion of the lug interiorly adjacent the contacting surface 18 toward the weld zones, sets up stresses internally within the lug which additionally act to confine the weld nuggets to prevent expulsion. This is schematically shown by the lines and arrows 84 of FIG. 8, which represent the compressive forces exerted by the inner beveled surface 26 of the forging portion 16. Finally, the depth of the recess 28 between the extrusion portion 12 and the forging portion 16 is believed to provide a certain degree of relief for leads squeezed between the electrodes, and that lead may actually be forged up into the annular recess 28 in the electrode rather than be expulsed from the weld zone.

Figure 6:
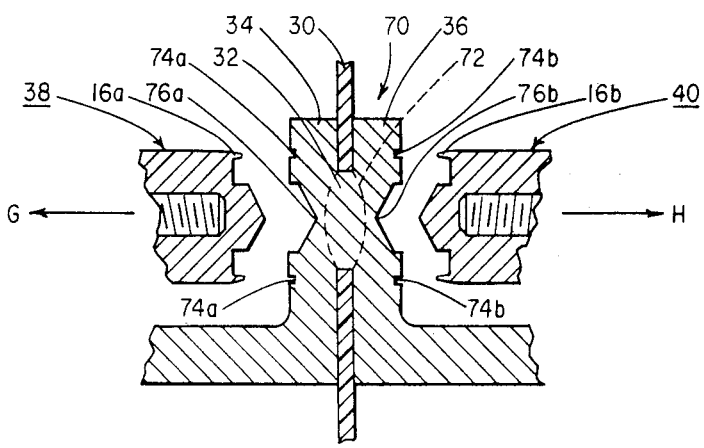
FIG. 6 is a cross section similar to FIGS. 3-5, wherein the connection is complete and the electrodes have been withdrawn therefrom, showing the completed weld configuration.

Referring now in particular to FIG. 6, wherein the electrodes 38 and 40 are being withdrawn in the direction G and H respectively, to reveal a finished weld, may be seen that the final intercell connection designated generally 70 is extremely homogeneous and completely lacking in the air pockets or "worm holes" which typify welds produced by prior art methods. At the present time, it is also not understood why the method of the present invention consistently produced weld nuggets which, upon sectioning and etching to show grain structure, exhibit an extremely wide weld zone 72 which is generally disposed in the configuration shown in FIG. 6.

Figure 7:
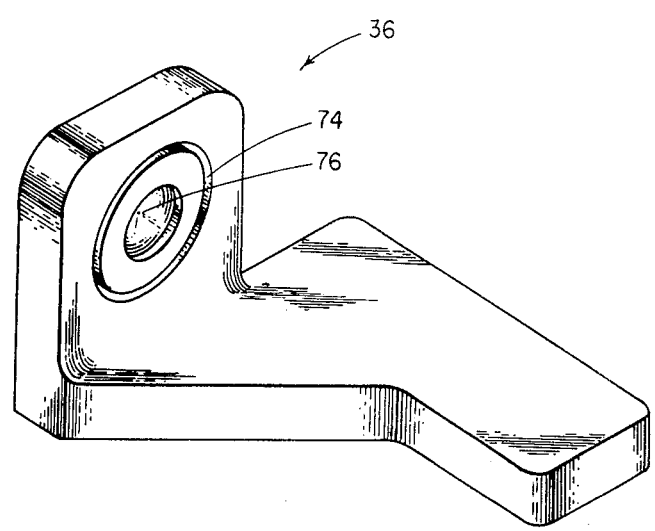
FIG. 7 is a perspective view of a strap and lug showing the external appearance of a lug in which an intercell connection in accordance with the present invention has been made.

In FIGS. 6 and 7, the final configuration of the intercell connection produced in accordance with the method of the present invention is clearly illustrated. This intercell connection is, as aforesaid, characterized by large uniform weld nugget 72 which is disposed to completely fill the aperture 32 within the partition 30. Annular depressions 74a and 74b which have been formed by the forging portions 16a and 16b of the electrodes 38 and 40 respectively, are seen encircling the center of the connection, while central concave, conical depressions 76a and 76b are disposed in the center of the intercell connection.

In order to determine the comparative strengths of the intercell weld illustrated in FIG. 6, the weld produced using the method of the present invention was tested against conventional welds produced by prior art method using a "stepped electrode". Shear tests were conducted on standard lead and antimony lugs which were welded with similar currents through partition apertures. In all instances a 3¼ inch air cylinder was utilized in order to provide shearing force across the lug on one side of the partition while the lug on the other side of the partition was rigidly held. The values obtained by these tests represent the air pressure applied to the 3¼ inch cylinder and, accordingly, are proportional to the pounds of shear force supplied to each intercell connection in order to break it. Intercell connections produced using the prior art method employing the "stepped electrode", are found to shear generally at between 100 to 120 pounds of air pressure. By comparison, intercell connections produced by the method of the present invention utilizing the preferred embodiment electrode described therein, generally sheared between about 190 to 200 pounds of pressure. Accordingly, the use of applicants invention enabled the formation of intercell welds which are not sensitive to dimensional irregularities in the lugs to be welded or the precise alignment of those lugs with respect to the apertures through which the intercell connection is to be made.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A method of welding lead parts through an aperture in a wall of a battery case utilizing an electrode comprising at least an extruding portion for extruding portions of said parts to touch within said aperture, and a contacting portion for contacting other portions of said parts during the welding of said parts, comprising the steps of:
   a. positioning said parts on opposite sides of said aperture to at least entirely overlap said aperture;
   b. extruding at least a portion of said parts into said aperture at least until said contacting portion contacts a surface of said part and said extruded portions touch within said aperture;
   c. limiting the degree of contact between said parts within said aperture responsive to the degree of contact between said contacting portion and said lead part;

d. passing current through said parts to melt said portions of said parts at least within said aperture; and e. compressing at least said melted portions within said aperture.

2. The invention of claim 1 further comprising the step of forging unmelted portions of said parts surrounding said aperture at least during a portion of said compressing step.

3. The invention of claim 2 wherein said forging step forms an annular depression surrounding said aperture.

4. The invention of claim 2 wherein at least a portion of said unmelted portion is sheared during said forging step.

5. The invention of claim 2 wherein at least a portion of said unmelted portion is formed generally toward said aperture during said forging step.

6. The invention of claim 1 wherein the limiting provided by the performance of step c is responsive to the distance between the leading surface of the extruding portion and the leading surface of the contacting portion.

7. The invention of claim 6 wherein the distance is substantially equal to ½ the thickness of the battery wall.

8. The invention of claim 6 wherein the limiting provided by the performance of step c occurs substantially irrespective of the thickness of the lead parts.

9. The invention of claim 1 wherein the limiting provided by the performance of step c is provided by temporarily stalling movement of the electrodes.

10. The invention of claim 1 wherein the performance of step d forms a conical depression.

11. The invention of claim 1 wherein at least a portion of said melted portions are formed generally toward said aperture boundary during said compressing step.

* * * * *